May 2, 1950    W. R. ANUSZKIEWICZ    2,505,847
EXPANSIBLE WEDGE
Filed May 12, 1948
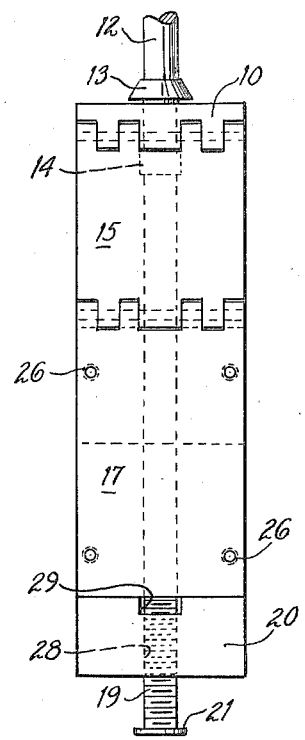
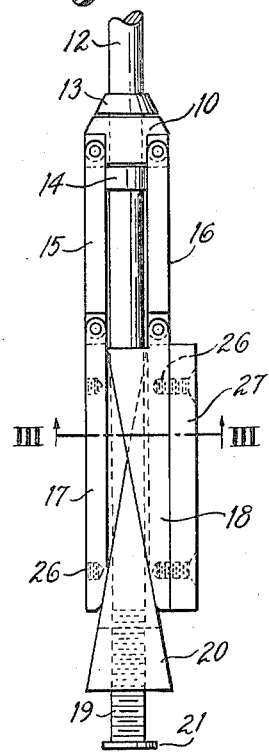
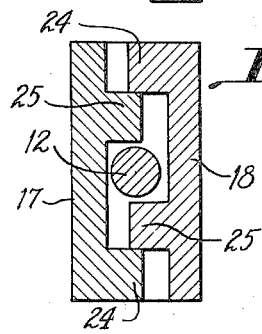
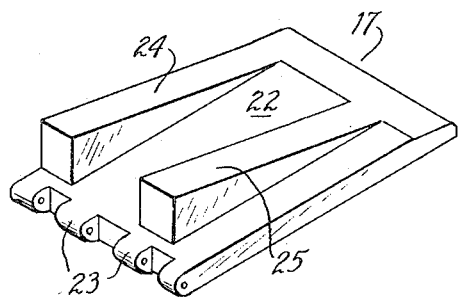
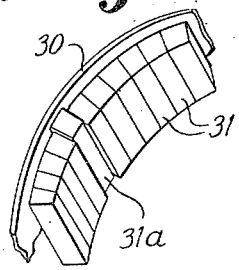
INVENTOR.
Walter R. Anuszkiewicz
BY Donald G. Dalton
HIS ATTORNEY Patented May 2, 1950

2,505,847

UNITED STATES PATENT OFFICE 2,505,847

EXPANSIBLE WEDGE

Walter R. Anuszkiewicz, McKeesport, Pa., assignor to National Tube Company, a corporation of New Jersey Application May 12, 1948, Serial No. 26,649

5 Claims. (Cl. 254—104)

This invention relates to expansible wedges.

An object of this invention is to provide improved expansible wedges of sturdy and simplified construction and in which the thrust elements are maintained parallel throughout a wedging operation.

A further object of the invention is to provide improved expansible wedges in which the thrust elements may be expanded or retracted in parallelism without application of impact blows, thereby lessening the likelihood of damage to parts being wedged and facilitating removal of the wedge after completion of the wedging operation.

A further object of the invention is to provide improved expansible wedges especially suited for placing carbon blocks in the walls of blast furnace hearths.

In accomplishing these and other objects of the invention, I have provided improved details of structure, a preferred form of which is shown in the accompanying drawing, in which:

Figure 1 is a front elevational view of an improved expansible wedge embodying features of the present invention;

Figure 2 is a side elevational view of the wedge shown in Figure 1;

Figure 3 is a sectional view taken substantially on line III—III of Figure 2;

Figure 4 is a perspective view of one of the thrust elements used in the wedge shown in Figures 1 and 2; and Figure 5 is a perspective view of a portion of a blast furnace hearth illustrating one mode of using the expansible wedge of the present invention.

Referring more in detail to the drawing:

The expansible wedge of the present invention comprises a bearing block 10 and a spindle 12 rotatably received in said block. The outer end of the spindle is provided with means, not shown, for rotating the spindle. The spindle has positioning collars 13 and 14 on opposite sides of bearing block 10 to prevent relative longitudinal movement between the spindle and block. A pair of wings 15 and 16 are hinged to opposite sides of block 10. Preferably in their retracted position the wings are parallel to each other and to the spindle axis as shown in Figure 2. Thrust elements 17 and 18 are hinged to the extremities of said wings. Spindle 12 has a screw threaded section 19. A wedging element 20 is threadedly engaged with the threaded section of the spindle and is adapted to force thrust elements 17 and 18 apart to perform a wedging operation. Preferably the extremity of spindle 12 has a stop 21 to limit movement of wedging element 20.

The details of a preferred design of thrust elements 17 and 18 are shown in Figure 4. The thrust element has a flat body 22, hinge bearings 23 on an edge of said body, and inclined planes 24 and 25 on the interior face of said body, all formed integrally. Inclined plane 24 is situated adjacent an edge of the body and inclined plane 25 is spaced inwardly from the edge by a distance substantially equal to the breadth of inclined plane 24. The inclined planes of the two wedge elements 15 and 16 thus interfit as shown in Figure 3, leaving a central passage that accommodates spindle 12. The angle of inclination of the inclined planes is rather small, preferably on the order of 5 to 12 degrees to furnish a large mechanical advantage.

Preferably the outer faces of the thrust elements are drilled and tapped, as indicated at 26, to enable shims 27 to be fixed to the outer faces, and thus to increase the effective thickness of the wedge as needed.

Wedging element 20 forms an isosceles triangle in end elevation and its apex is directed toward bearing block 10. The thicker end has a central bearing passage 28 which threadedly receives spindle 12. Above the bearing passage the midportion of the wedging element is recessed at 29. The outside faces of the wedging element form inclined planes cooperable with those on the thrust elements and having the same inclination from the central axis. Thus as long as the thrust elements are in contact with the wedging element, their outer faces are parallel. The interfitting inclined planes on the thrust elements provide balanced bearing surfaces on each side of the spindle for engagement with the wedging element.

Use of the expansible wedge of the present invention is not limited to any specific application. Nevertheless the wedge is particularly suited for placing carbon blocks in the walls of blast furnace hearths. Hence I shall describe operation of the wedge used for this purpose, although this description is not to be construed as thus limiting use of the device.

As shown in Figure 5, a typical blast furnace hearth includes a cylindrical jacket 30 which is lined with one or more layers of carbon blocks 31 that are about five feet high. In constructing a hearth, a circular erection line is inscribed on the hearth bottom as a guide in setting and placing the vertical carbon blocks 31. Each block 31 is placed with its inner edge eased up to the erection line by my expansible wedge positioned between the rear face of block 31 and cylindrical jacket 30. Beginning at the iron notch, half of the circumference of the hearth blocks is erected and cemented, a quadrant on each side of the starting point. Opposite the iron notch the second half of the hearth circumference is started and similarly erected. The gaps then remaining for the last two blocks 31a are too small to receive the blocks freely. Hence the gaps are widened by heavy screw jacks until wide enough to receive the last blocks. These blocks are then wedged into place by force applied between the inside jacket 30 and the rear face of blocks 31a.

Thrust elements 17 and 18 of the expansible wedge are inserted between the interior face of jacket 30 and the rear faces of blocks 31 and 31a. Spindle 12 is rotated and thus wedging element 29 is moved up the inclined planes of thrust elements 17 and 18. The thrust elements are forced apart in parallelism and thus force blocks 31 to the erection line and blocks 31a evenly into place alongside blocks 31. After each block is placed, the spindle is rotated in the opposite direction moving the wedging element down the inclined planes on the thrust elements and releasing the force against the block. The wedge may then be freely lifted out of the hearth.

From the foregoing description it is seen that the thrust elements of the wedge are maintained parallel during a wedging operation and thus the bodies being wedged are moved evenly. The need for impact blows is eliminated, thus lessening the likelihood of damage to any parts.

While I have shown and described only a single embodiment of the invention, it is apparent that modifications may arise. Therefore, I do not wish to be limited to the disclosure set forth but only by the scope of the appended claims.

I claim:

1. An expansible wedge comprising a bearing block, a spindle rotatably carried by said bearing block and having a screw threaded section, a pair of wings hinged to opposite sides of said bearing block, thrust elements hinged to the extremities of said wings, and a wedging element threadedly engaged with the threaded section of said spindle and slidably engaging said thrust elements for forcing them apart in parallelism on rotation of said spindle.

2. An expansible wedge comprising a bearing block, a spindle rotatably carried by said bearing block and having a screw threaded section, a pair of wings hinged to opposite sides of said bearing block, thrust elements hinged to the extremities of said wings and having inclined planes on their inner faces, and a wedging element threadedly engaged with the threaded section of said spindle, the sides of said wedging element forming inclined planes cooperable with the inclined planes on said thrust elements for forcing said thrust elements apart in parallelism on rotation of said spindle.

3. An expansible wedge comprising a bearing block, a spindle rotatably carried by said bearing block and having a screw threaded section, a pair of wings hinged to opposite sides of said bearing block, thrust elements hinged to the extremities of said wings and each having an inclined plane adjacent one inner edge and a second inclined plane spaced inwardly from the other inner edge by a distance substantially equal to the breadth of the first inclined plane, said inclined planes on opposite thrust elements interfitting but leaving a central passage accommodating said spindle, and a wedging element threadedly engaged with the threaded section of said spindle, the sides of said wedging element forming inclined planes cooperable with the inclined planes on said thrust elements for forcing said thrust elements apart in parallelism on rotation of said spindle.

4. An expansible wedge comprising a bearing block, a spindle rotatably carried by said bearing block and having a screw threaded section, a pair of wings hinged to opposite sides of said bearing block, thrust elements hinged to the extremities of said wings and having interfitting inclined planes on their inner faces, and a triangularly shaped wedging element threadedly engaged with the threaded section of said spindle and having its apex directed toward said bearing block, the sides of said wedging element forming inclined planes of inclination similar to that of the inclined planes on said thrust elements and cooperable with the latter to force said thrust elements apart in parallelism on rotation of said spindle.

5. An expansible wedge comprising a bearing block, a spindle rotatably carried by said bearing block and having a screw threaded section, a pair of wings hinged to opposite sides of said bearing block, thrust elements hinged to the extremities of said wings and each having an inclined plane adjacent one inner edge and a second inclined plane spaced inwardly from the other inner edge by a distance substantially equal to the breadth of the first inclined plane, said inclined planes on opposite thrust elements interfitting but leaving a central passage accommodating said spindle, and a triangularly shaped wedging element threadedly engaged with the threaded section of said spindle and having its apex directed toward said bearing block, the sides of said wedging element forming inclined planes of inclination similar to that of the inclined planes on said thrust elements and cooperable with the latter to force said thrust elements apart in parallelism on rotation of said spindle.

WALTER R. ANUSZKIEWICZ.

No references cited.